(12) United States Patent
Osborne et al.

(10) Patent No.: US 10,511,067 B2
(45) Date of Patent: Dec. 17, 2019

(54) SYSTEM AND METHOD TO DIVERT INDUCTIVE ENERGY FROM CELLS

(71) Applicant: Black & Decker Inc., Newark, DE (US)

(72) Inventors: Nathan Osborne, Baltimore, MD (US); Robert J. Marcinkowski, Cockeysville, MD (US); Christopher Held, Glen Rock, PA (US); Ralphy A. Louis, York, PA (US); Daniel J. White, Baltimore, MD (US); Michael Forster, White Hall, MD (US); Bhanu V. Gorti, Perry Hall, MD (US); Geoffrey S. Howard, Columbia, MD (US); Tony J. Agro, San Antonio, TX (US); Michael Varipatis, Fallston, MD (US)

(73) Assignee: Black & Decker Inc., New Britain, CT (US)

( * ) Notice: Subject to any disclaimer, the term of this patent is extended or adjusted under 35 U.S.C. 154(b) by 1473 days.

(21) Appl. No.: 13/974,504

(22) Filed: Aug. 23, 2013

(65) Prior Publication Data

US 2015/0054428 A1    Feb. 26, 2015

(51) Int. Cl.
*H02P 7/00* (2016.01)
*H01M 10/42* (2006.01)
*H02J 7/34* (2006.01)

(52) U.S. Cl.
CPC ......... *H01M 10/4264* (2013.01); *H02P 7/00* (2013.01); *H02J 7/345* (2013.01)

(58) Field of Classification Search
CPC ........................ Y02T 10/7005; B60W 10/08

USPC .......... 318/139, 432, 434; 320/112; 388/937
See application file for complete search history.

(56) References Cited

U.S. PATENT DOCUMENTS

| | | | | |
|---|---|---|---|---|
| 4,084,123 A | * | 4/1978 | Lineback | B23K 3/0323 30/DIG. 1 |
| 5,587,250 A | * | 12/1996 | Thomas | H01G 9/00 429/3 |
| 5,821,006 A | * | 10/1998 | Patel | H01M 2/105 429/3 |
| 5,821,007 A | * | 10/1998 | Harshe | H01M 10/42 361/434 |
| 6,373,152 B1 | * | 4/2002 | Wang | H02J 7/345 307/109 |

(Continued)

*Primary Examiner* — Rina I Duda
(74) *Attorney, Agent, or Firm* — Harness, Dickey & Pierce, PLC

(57) ABSTRACT

A power tool/battery pack combination includes an electric motor, one or more electrochemical cells, and a capacitive element. The electric motor is connected in series to a first switch. The series combination of the electric motor and the first switch is connected to a first terminal and a second terminal. The one or more electrochemical cells are connected across a third terminal and a fourth terminal. The third terminal and the fourth terminal are coupled respectively to the first terminal and the second terminal. The one or more electrochemical cells supply power to the electric motor via the first switch. The capacitive element includes one or more capacitors. The capacitive element is connected across the third terminal and the fourth terminal. The capacitive element is capable of storing inductive energy generated by the one or more electrochemical cells.

10 Claims, 10 Drawing Sheets

(56) References Cited

U.S. PATENT DOCUMENTS

| | | | |
|---|---|---|---|
| 7,085,123 B2* | 8/2006 | Shiue | H02J 7/345 |
| | | | 320/165 |
| 7,183,014 B2* | 2/2007 | Sasaki | H01M 6/50 |
| | | | 429/61 |
| 7,230,352 B2* | 6/2007 | Bedard | H02J 7/345 |
| | | | 307/109 |
| 7,471,016 B2* | 12/2008 | Stoicescu | H01M 10/425 |
| | | | 307/150 |
| 7,541,773 B2* | 6/2009 | Funabashi | B25F 5/00 |
| | | | 320/112 |
| 7,728,553 B2* | 6/2010 | Carrier | H01M 2/1022 |
| | | | 320/116 |
| 7,928,692 B2* | 4/2011 | Carrier | H01M 2/1022 |
| | | | 320/116 |
| 8,481,203 B2* | 7/2013 | Reis | H01M 2/1077 |
| | | | 429/178 |
| 2002/0079111 A1* | 6/2002 | Camp | B25C 1/06 |
| | | | 173/217 |
| 2007/0103113 A1* | 5/2007 | Embrey | H02J 7/0011 |
| | | | 320/112 |
| 2009/0038815 A1* | 2/2009 | Lin | B25C 1/06 |
| | | | 173/104 |

* cited by examiner

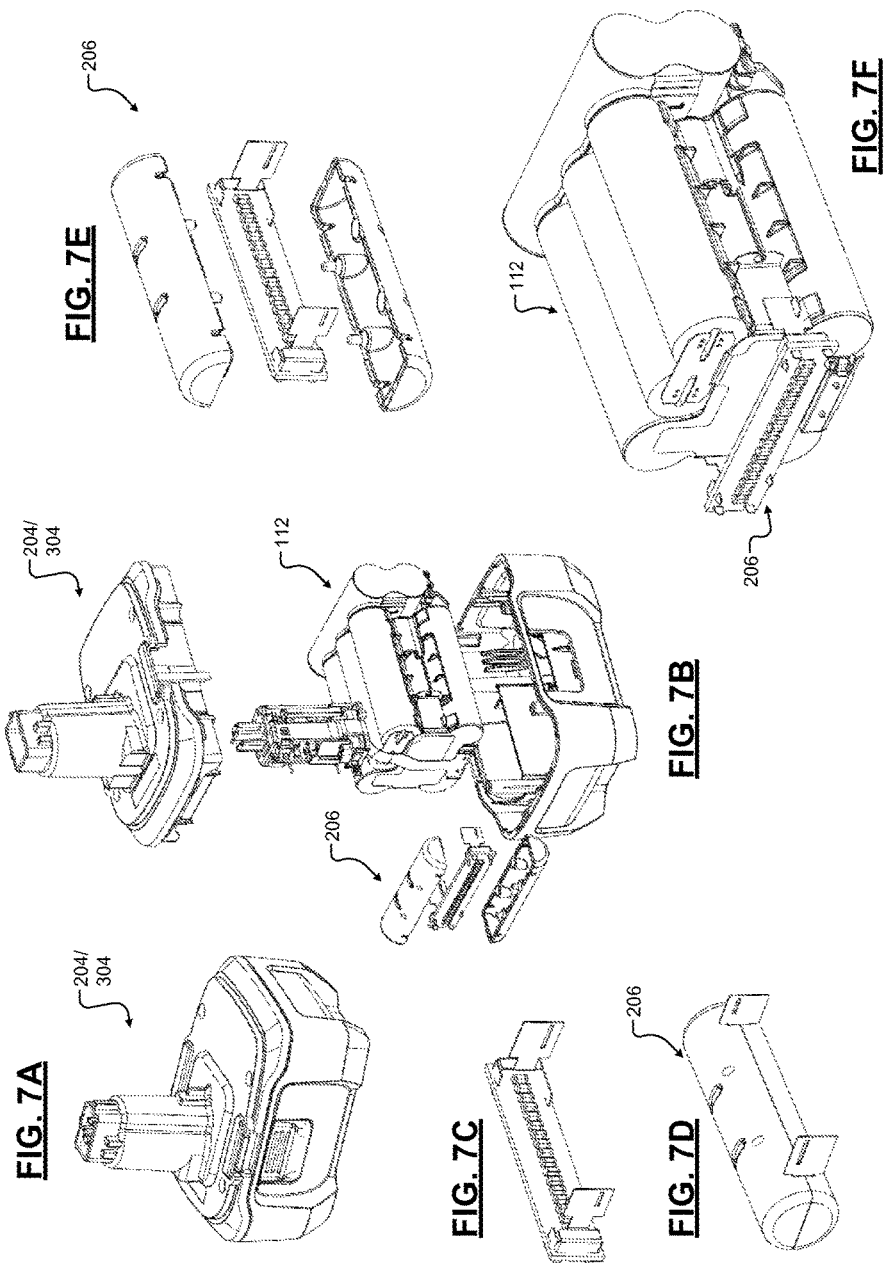

SYSTEM AND METHOD TO DIVERT INDUCTIVE ENERGY FROM CELLS

FIELD

The present disclosure relates generally to a battery pack and more particularly to a technique for diverting inductive energy from the cells of the battery pack away from components connecting the battery pack to a load.

BACKGROUND

Battery packs can be used with a variety of devices. These devices include power tools. Power tools are of many types. Examples of power tools include drills, drill/drivers, hammer drill/drivers, rotary hammers, screwdrivers, impact drivers, circular saws, jig saws, reciprocating saws, band saws, cut-off tools, cut-out tools, shears, sanders, vacuums, adhesive dispensers, concrete vibrators, staplers, nailers, flashlights, radios, and lasers.

Power tools typically receive electrical power from a wall outlet or from the battery pack that is removably coupled to the power tools. The battery pack may include one or more electrochemical cells (hereinafter "cells"). The cells can be of different types. For example, the battery pack may include nickel-cadmium (NiCd) cells or lithium-ion (Li-ion) cells.

The power tools typically include a motor and a switch that is used to vary the speed of the motor. During variable speed mode, the switch is typically turned on and off (closed and opened) using pulse width modulated signals. The speed of the motor is varied by varying a duty cycle of the pulse width modulated signals. The circuitry that generates the pulse width modulated signals may be included in the tool portion or the battery back portion of the power tool. Some power tools may not have the variable speed feature and may simply have on/off mode.

One of the electrical characteristics of the cells is that each cell has an inductance. The value of the inductance depends on the chemical composition and mechanical construction of the cell. Due to the inductance of the cell, an inductive energy builds up in the cell while the switch is closed. When the battery or tool switch is turned off, the inductive energy typically dissipates across the tool or battery switch and heats the switch. Depending on the value of the inductance, the frequency and the duty cycle at which the switch is turned on and off by the pulse width modulated signal, the heat generated by the inductive energy can cause the switch to malfunction.

Therefore, in order to prevent the switch from heating and malfunctioning, it is desirable to provide a protective device that will divert the inductive energy from the cells of the battery pack. The protective device can prevent the inductive energy from dissipating across the switch, thereby preventing the switch from malfunctioning.

The statements in this section merely provide background information related to the present disclosure and may not constitute prior art.

SUMMARY

In one embodiment, a power tool and battery pack combination comprises a power tool including an electric motor connected in series to a first switch. The series combination of the electric motor and the first switch is connected to a first terminal and a second terminal. The combination also comprises a battery pack including one or more electrochemical cells connected across a third terminal and a fourth terminal. The third terminal and the fourth terminal are coupled respectively to the first terminal and the second terminal. The one or more electrochemical cells supply power to the electric motor via the first switch. A capacitive element including one or more capacitors is connected across the third terminal and the fourth terminal. The capacitive element is capable of storing inductive energy generated by the one or more electrochemical cells.

The capacitive element prevents the inductive energy from being applied to the first switch in response to the motor being operated at varying speeds. A value of the capacitive element depends on a voltage supplied by the one or more electrochemical cells and a chemical composition of the one or more electrochemical cells. The one or more electrochemical cells are connected in series, in parallel, or using a combination of series and parallel connections. The one or more capacitors are connected in series, in parallel, or using a combination of series and parallel connections.

The combination further comprises a fuse coupled to the one or more capacitors. The fuse transforms into an open circuit when one of the one or more capacitors associated with the fuse malfunctions. The combination further comprises a second switch connected in series with the first switch. The second switch has a higher power rating than the first switch. The combination further comprises a controller to control the second switch. The controller opens the second switch to stop the supply of power from the one or more electrochemical cells to the electric motor when a temperature, voltage, or current of the one or more electrochemical cells crosses a predetermined threshold. An inductance of the one or more electrochemical cells is a sum of inductances of each of the one or more electrochemical cells. A value of the inductance depends on a design of the one or more electrochemical cells.

In another embodiment, a battery pack for supplying power to a power tool comprises a housing. At least one electrochemical cell is contained in the housing. The at least one electrochemical cell has a geometry and is connected across a first terminal and a second terminal of the housing. A compartment contained in the housing has a geometry equivalent to the geometry of the at least one electrochemical cell. A capacitive element is contained in the housing. The capacitive element includes at least one capacitor. The capacitive element is connected across the first terminal and the second terminal of the housing. The capacitive element stores inductive energy generated by the at least one electrochemical cell. A value of the capacitive element depends on a voltage supplied by the at least one electrochemical cell and a chemical composition of the at least one electrochemical cell. In yet another embodiment, there are at least two electrochemical cells and the at least two electrochemical cells are connected in series, in parallel, or using a combination of series and parallel connections. There are at least two capacitors and the at least two capacitors are connected in series, in parallel, or using a combination of series and parallel connections.

The battery pack further comprises a fuse coupled to one or more capacitors of the capacitive element. The fuse transforms into an open circuit when one of the one or more capacitors associated with the fuse malfunctions. The battery pack further comprises a switch and a controller that opens the switch to stop the supply of power from the at least one electrochemical cell to a load when a temperature, voltage, or current of the at least one electrochemical cell crosses a predetermined threshold. An inductance of the at least one electrochemical cell is a sum of inductances of each of the at least one electrochemical cell. A value of the inductance depends on a design of the at least one electrochemical cell.

In another embodiment, a battery pack for a power tool comprises a capacitive element, at least one electrochemical cell having a geometry, and a plurality of compartments contained in a housing. Each of the compartments has a geometry equivalent to the geometry of the at least one electrochemical cell. The capacitive element and the at least one electrochemical cell reside in respective compartments of the battery pack. The capacitive element includes at least one capacitor. The capacitive element is connected across a first terminal and a second terminal of the housing. The capacitive element stores inductive energy generated by the at least one electrochemical cell.

In another embodiment, a power tool and battery pack combination comprises an electric motor arranged in a first housing. The first housing includes a first terminal and a second terminal to receive power to drive the electric motor. At least one electrochemical cell is arranged in a second housing. The second housing includes a third terminal and a fourth terminal coupled respectively to the first terminal and the second terminal of the first housing. The at least one electrochemical cell is connected across the third terminal and the fourth terminal. A first switch resides in the first housing. The first switch connects the at least one electrochemical cell to the electric motor responsive to a first control signal. A first controller resides in the first housing. The first controller generates the first control signal. A capacitive element resides in the second housing.

The capacitive element includes at least one capacitor. The capacitive element is connected across the third terminal and the fourth terminal of the second housing. The capacitive element stores inductive energy generated by the at least one electrochemical cell thereby preventing the inductive energy from being applied to the first switch. The at least one electrochemical cell has a geometry. A plurality of compartments is contained in the second housing. Each of the plurality of compartments has a geometry equivalent to the geometry of the at least one electrochemical cell. The capacitive element resides in a first one of the plurality of compartments. The at least one electrochemical cell resides in a second one of the plurality of compartments. A value of the capacitive element depends on a voltage supplied by the at least one electrochemical cell and a chemical composition of the at least one electrochemical cell. In yet another embodiment, there are at least two electrochemical cells and the at least two electrochemical cells are connected in series, in parallel, or using a combination of series and parallel connections. There are at least two capacitors and the at least two capacitors are connected in series, in parallel, or using a combination of series and parallel connections.

The combination further comprises a fuse coupled to one or more capacitors of the capacitive element. The fuse transforms into an open circuit when one of the one or more capacitors associated with the fuse malfunctions. The combination further comprises a second switch residing in the second housing. The second switch is connected in series with the first switch. The second switch has a higher power rating than the first switch. A second controller resides in the second housing. The second controller generates a second control signal when a temperature, voltage, or current of the one or more electrochemical cells crosses a predetermined threshold. The second controller opens the second switch to stop the supply of power from the at least one electrochemical cell to the electric motor based on the second control signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7A-7F show an example of an arrangement of electrochemical cells and the capacitive element in the battery pack.

Figure 1:
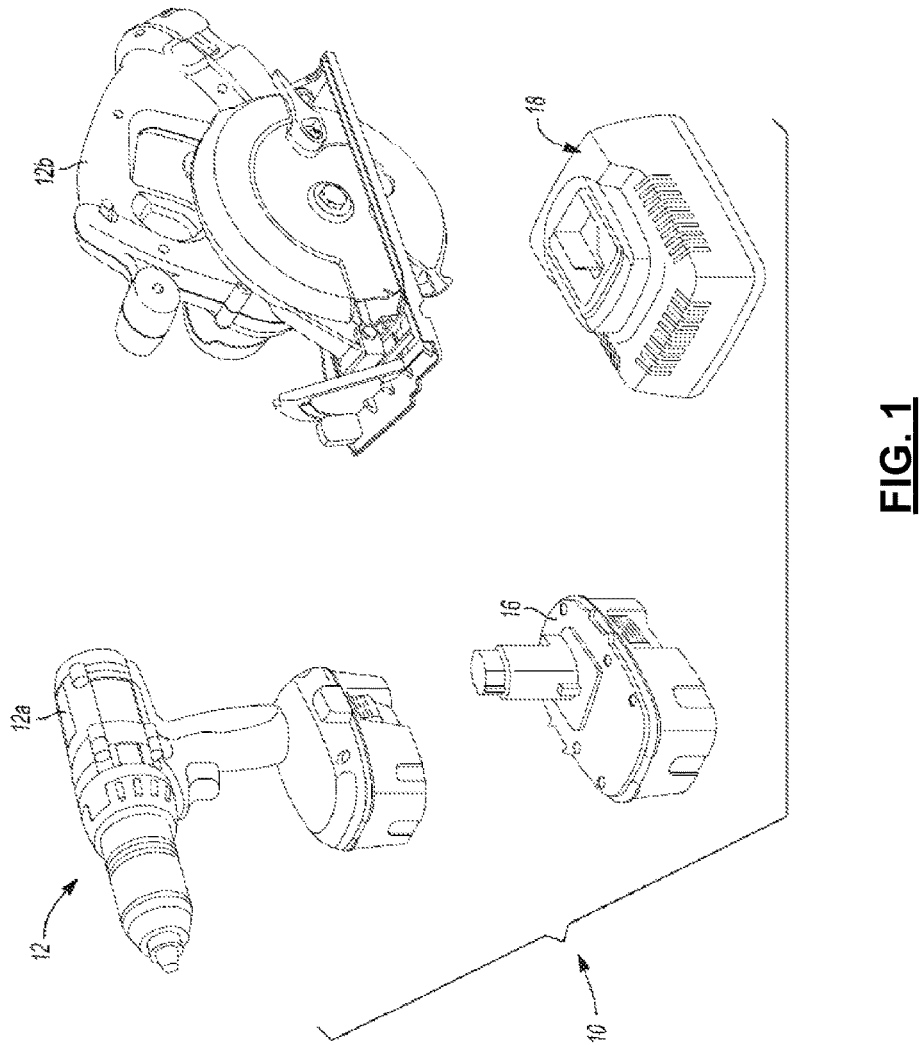
FIG. 1 is a diagram of an exemplary system of power tools.

The drawings described herein are for illustration purposes only and are not intended to limit the scope of the present disclosure in any way.

In the drawings, reference numbers may be reused to identify similar and/or identical elements.

DETAILED DESCRIPTION

FIG. 1 shows a system 10 of power tools. The system 10 of power tools can include, for example, one or more power tools 12, a battery pack 16, and a battery pack charger 18. Each of the power tools 12 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, adhesive dispensers, concrete vibrators, staplers, nailers, flashlights, radios, and lasers.

In the example shown, the system 10 of power tools includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The battery pack 16 can be selectively removably coupled to the first and second power tools 12a and 12b to provide electrical power thereto. Except as otherwise described herein, the battery pack 16 can be configured in a manner that is similar to that which is described in U.S. Pat. Nos. 7,273,759 and 7,508,171. The battery pack 16 can also be selectively electrically coupled to the battery pack charger 18 to charge the battery pack 16. It is noteworthy that the broader aspects of this disclosure are applicable to battery packs for other types of battery powered devices (e.g., flashlights, radios, and lasers).

Figure 2:
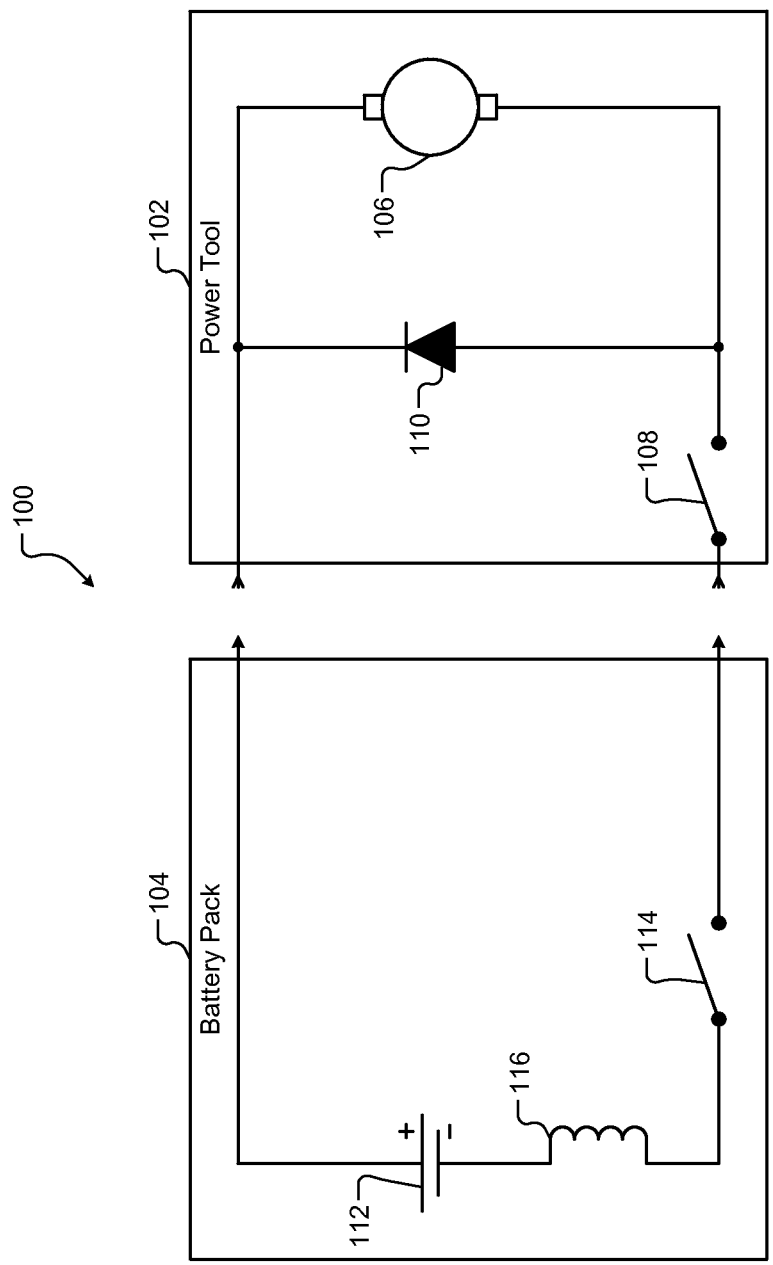
FIG. 2 is a functional block diagram of a power tool including a battery pack.

FIG. 2 shows an embodiment of a power tool/battery pack combination 100 including a battery pack that does not have a capacitive element. The combination 100 includes a power tool 102 and a battery pack 104. The power tool 102 and the battery pack 104 may be enclosed in separate housings. The power tool 102 includes a motor 106 and a switch 108. A freewheeling diode 110 may be connected across the motor 106. While not shown, a freewheeling diode may be connected across the battery pack 104 as well, to handle cases, for example, where the power tool has no freewheeling diode and the motor's inductive energy could damage a switch in the battery pack 104.

The battery pack 104 includes one or more electrochemical cells (hereinafter cells) 112 and may include a switch 114. The cells 112 may be connected to each other in series, in parallel, or using a combination of series and parallel connections. Each of the cells 112 has an intrinsic inductance. An effective inductance of the cells 112 is shown as an inductance 116 connected in series with the cells 112. The inductance 116 shown is an intrinsic inductance of the cells 112 and is shown externally connected to the cells 112 for illustrative purposes only.

In use, the battery pack 104 is connected to the power tool 102. The cells 112 supply power to the motor 106 through the switches 114 and 108. The switch 114 is closed when the power tool 102 is operated. The switch 114 can be opened and the power supply from the cells 112 to the motor 106 can be disconnected when a sensor (not shown for simplicity of illustration) senses that a temperature, voltage, or current of one or more cells 112 crosses a predetermined threshold. The switch 108 can be operated to vary the speed of the motor 106. For example, the switches 114 and 108 may be further defined as field effect transistors (FETs). The switch 108 may be driven by pulse width modulated signals having a duty cycle. The speed of the motor 106 can be varied by varying the duty cycle of the pulse width modulated signals. The switch 108 can also be in bypass mode, where the PWM circuit is not in use (e.g., if the trigger of the power tool 102 is fully depressed).

While the speed of the motor 106 is varied, each time the switch 108 turns on (closes), the inductive energy that is already built up in the cells 112 when the switch 108 is turned off, typically dissipates across the switch 108, thereby heating the switch 108. The inductive energy may also dissipate across the switch 114 and/or other circuit components. Depending on the value of the inductance 116 of the cells 112 and depending on the duty cycle at which the switch 108 is turned on and off, the switch 108 (and/or other circuit components) can heat excessively and/or malfunction. The value of the inductance 116 depends primarily on the design and construction of the cells 112.

Figure 3:
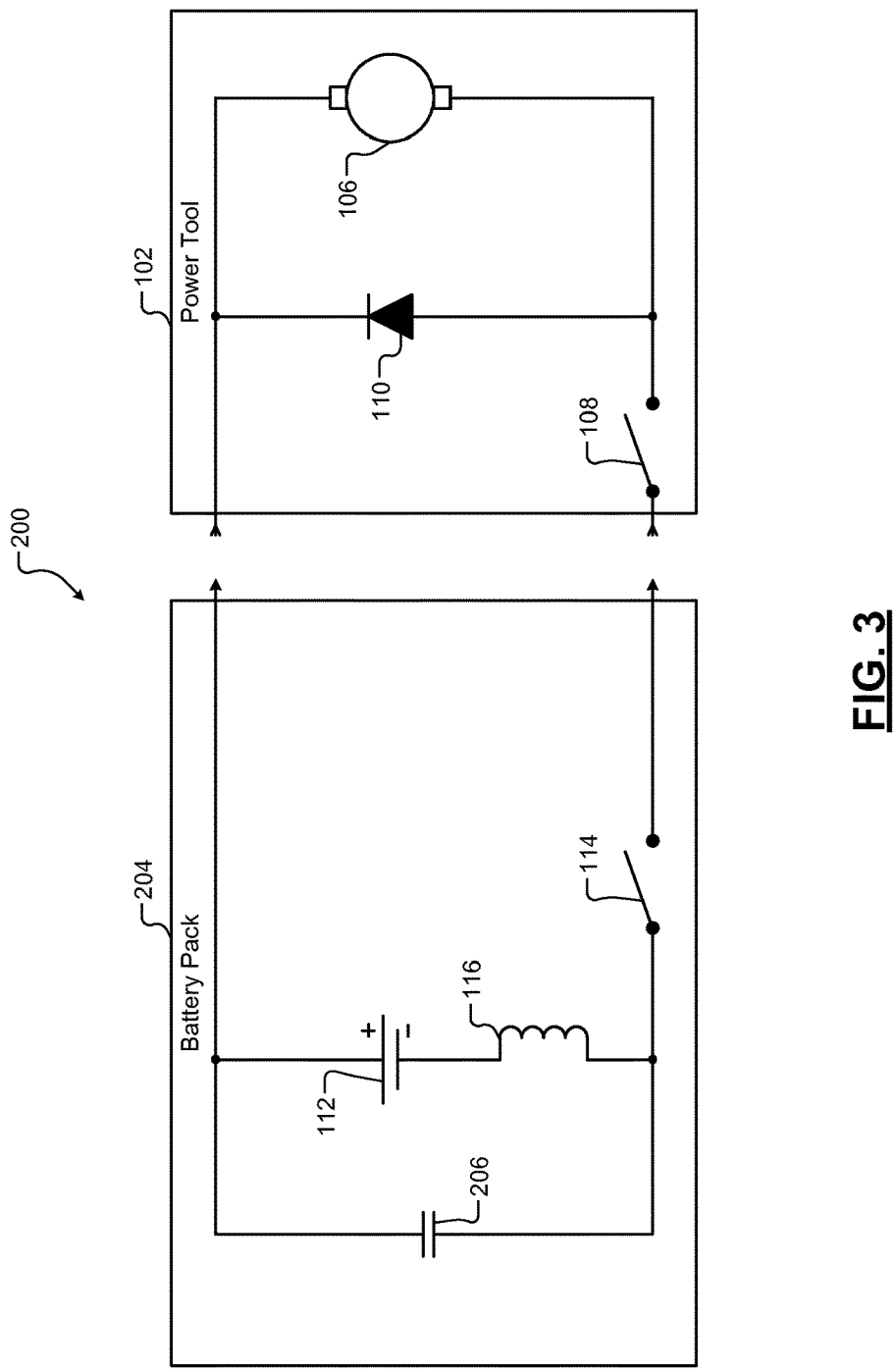
FIG. 3 is a functional block diagram of a power tool including a battery pack that has a capacitive element.

FIG. 3 shows an embodiment of a power tool/battery pack combination 200 including a battery pack that has a capacitive element. The combination 200 includes the power tool 102 and a battery pack 204. The battery pack 204 includes all of the components of the battery pack 104. Additionally, the battery pack 204 includes a capacitive element 206. The capacitive element 206 may include one or more capacitors. The capacitors may be connected to each other in series, in parallel, or using a combination of series and parallel connections. While the speed of the motor 106 is varied, each time the switch 108 turns off, the capacitors store the inductive energy generated by the cells 112, thereby preventing the inductive energy from being applied to the switch 108.

The inductive energy is dissipated at a natural frequency of an RLC circuit formed by the capacitive element 206, the inductance of the cells 112, and the internal resistance of the circuitry. The use of the capacitive element 206 is not restricted to power tools with variable speed. The capacitive element 206 can also be used with power tools that are simple on/off type. When an on/off type power tool shuts off, the capacitive element 206 can be used to absorb the inductive energy generated by the cells to prevent damage to control circuitry of the on/off type power tool. In general, the capacitive element 206 can be used to protect any switch in a high current path in a circuit.

The value (i.e., the capacitance) of the capacitive element 206 may depend on the voltage rating of the cells 112. In addition, the value of the capacitive element 206 may depend on the chemical composition and mechanical construction of the cells 112. Each capacitor in the capacitive element 206 may have a different value. Alternatively, all of the capacitors in the capacitive element 206 may have the same value.

For example, consider a battery and tool system, where a certain amount of energy J needs to be diverted to the capacitive element 206. The energy, J, may be the avalanche energy of a MOSFET when the MOSFET opens (turns off). The capacitance C of the capacitive element 206 can be estimated by the maximum energy stored by a capacitor:

$$J = \frac{1}{2}CV^2,$$

where C is the capacitance of the capacitor (the capacitive element 206), and V is the voltage across the capacitor when the energy absorption needs to occur. According to the present disclosure, the required capacitance of the capacitive element 206 is primarily a function of the inductance of each of the cells 112.

Suppose a battery with a first cell arrangement (e.g., 20 v at 4 v per cell) has a total inductance of L and an already determined capacitance C for the capacitive element 206. Assuming the same cell is used, a battery with a second cell arrangement (e.g., 16 v at 4 v per cell) would have 80% of the inductance first cell arrangement, and a corresponding capacitance requirement of approximately 0.80*C. A third cell arrangement (e.g., 12 v at 4 v per cell) would have 60% of the first cell arrangement, and a corresponding capacitance requirement of approximately 0.60*C. Because the inductance is halved when cells are connected in parallel, the first cell arrangement employing cells connected in parallel with the same cell and tool system would theoretically require 2*C capacitance, the second cell arrangement employing cells connected in parallel with the same cell and tool system would require 0.8*2*C capacitance, and so on.

Figure 4A:
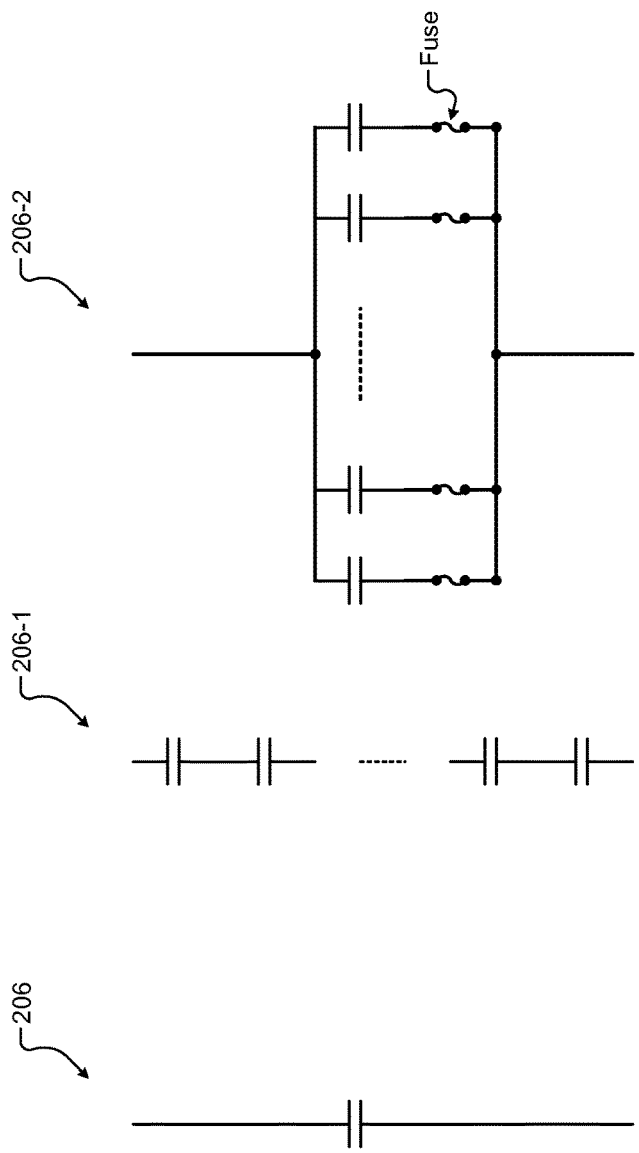
FIG. 4A shows different arrangements of capacitors in the capacitive element.

A fuse may be associated with one or more capacitors in the capacitive element 206. In the event that a capacitor malfunctions, the fuse associated with the malfunctioning capacitor may open thereby transforming the malfunctioning capacitor into an open circuit, thereby effectively removing the malfunctioning capacitor from the circuit. FIG. 4A (described below) shows an example arrangement including the fuse.

The housing of the battery pack 204 may include a plurality of compartments. Each compartment may have the same geometry. The cells 112 may reside in one or more of the compartments. That is, each of the cells 112 resides in a respective one of the compartments. The capacitive element 206 can reside in any of the compartments where one of the cells 112 can reside instead. In other words, the compartment in which the capacitive element 206 resides has the same geometry as the compartment in which one of the cells 112 resides. Accordingly, one of the cells 112 can be removed from its compartment and can be substituted with an element having the same geometry as the cell, where the element houses the capacitive element 206. The electrical connections across the compartments are arranged in such a manner so that the capacitive element 206 is connected across (i.e., in parallel to) the cells 112.

In some implementations, the capacitive element 206 may not have the shape of a cell and may not have the same geometry as the compartment in which one of the cells 112 resides. Rather, the capacitive element 206 may simply comprise a PCB and could reside anywhere in the battery pack 204.

FIG. 4A shows examples of different arrangements that may be used to connect the capacitors in the capacitive element 206. For example, in the arrangement 206-1, the capacitors may be connected to each other in series to form the capacitive element 206. As another example, in the arrangement 206-2, the capacitors may be connected to each other in parallel to form the capacitive element 206. Alternatively, a combination of series and parallel connections of the capacitors may be used to form the capacitive element 206. In some implementations, the capacitive element 206 may be connected across each of the cells 112.

Figure 4B:
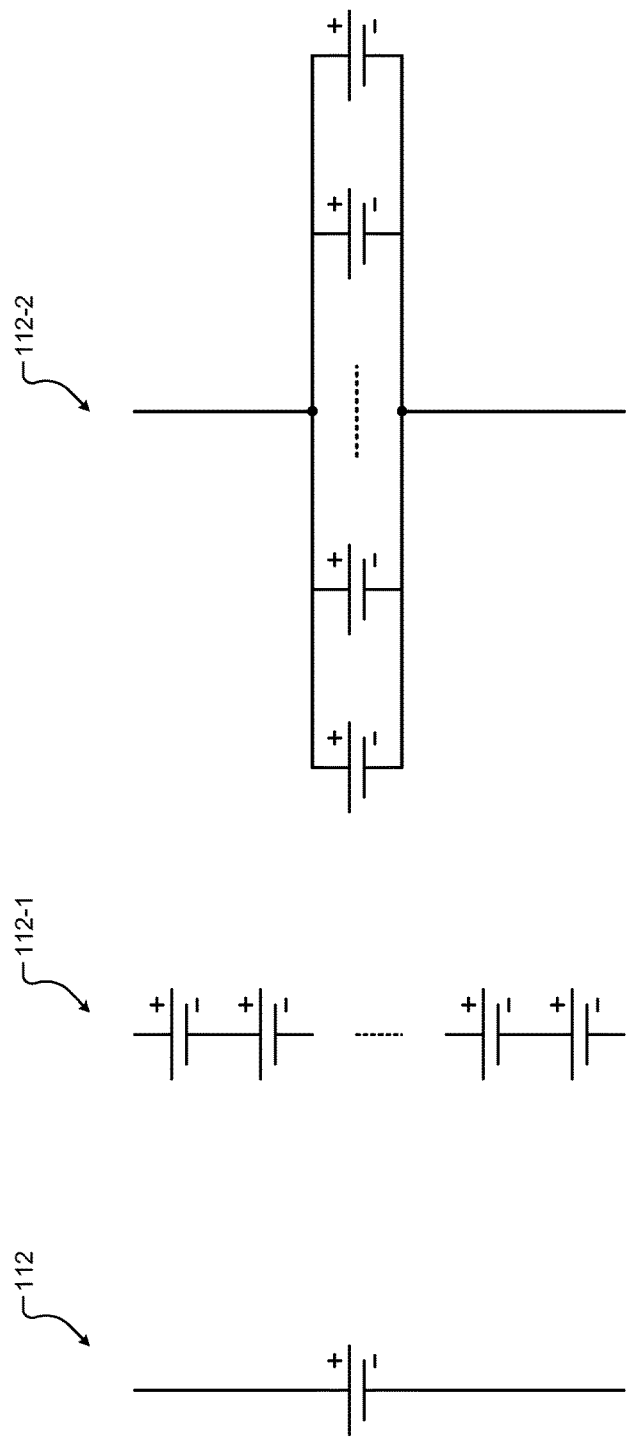
FIG. 4B shows different arrangements of electrochemical cells in a battery pack.

FIG. 4B shows examples of different arrangements that may be used to connect the cells 112. For example, in the arrangement 112-1, two or more cells may be connected to each other in series to form the cells 112. As another example, in the arrangement 112-2, two or more cells may be connected to each other in parallel to form the cells 112. Alternatively, a combination of series and parallel connections of cells may be used to form the cells 112.

Figure 5A:
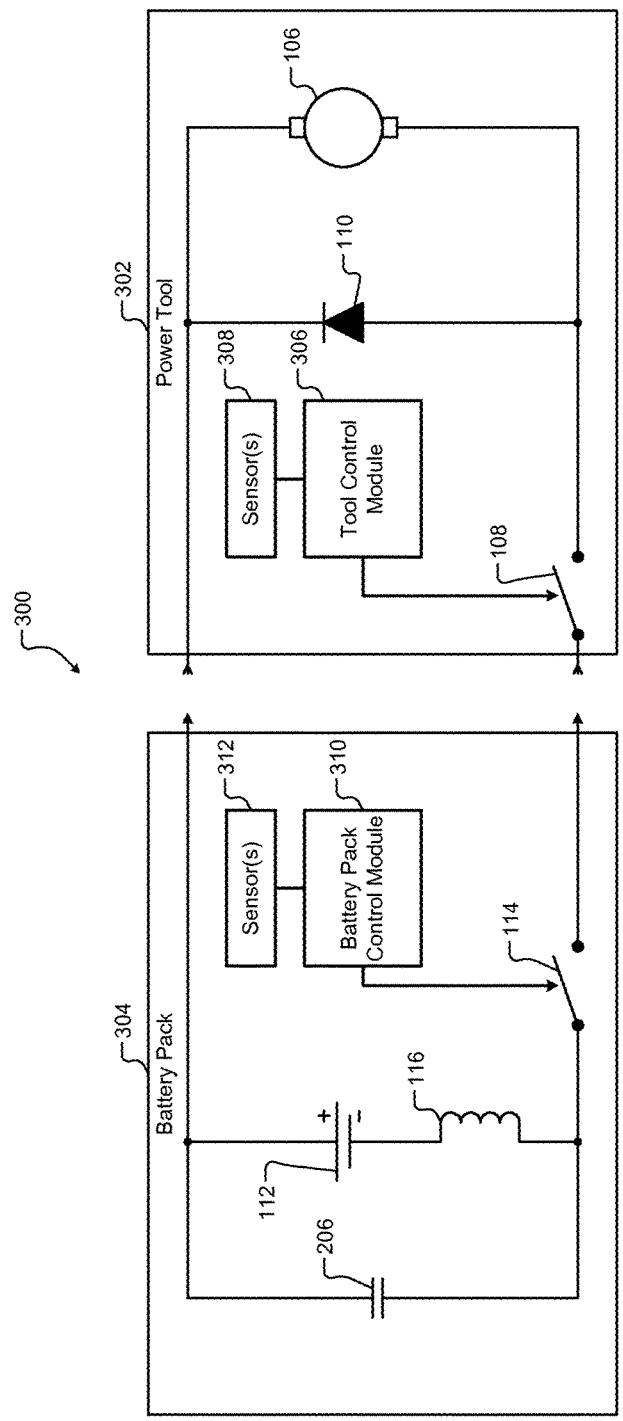
FIG. 5A is a functional block diagram of a power tool, where the tool and the battery pack include respective control modules.

FIG. 5A shows an alternative embodiment of a power tool/battery pack combination 300, where the tool and the battery pack include respective control modules. The combination 300 includes a power tool 302 and a battery pack 304. The power tool 302 includes all of the components of the power tool 102. Additionally, the power tool 302 includes a tool control module 306 and one or more sensors 308. The tool control module 306 generates control signals to control the switch 108. For example, the control signals may include pulse width modulated signals.

The sensors 308 may sense one or more conditions associated with one or more components of the tool 302. For example, one of the sensors 308 may sense a parameter associated with the motor 106. For example, the parameter may include a temperature of the motor 106, current through the motor 106, and so on. As another example, another one of the sensors 308 may sense a parameter associated with the switch 108. For example, the parameter may include a temperature of the switch 108, current through the switch 108, voltage across the switch 108, and so on.

The sensors 308 may output signals indicating the conditions of the components of the tool 302 to the tool control module 306. The tool control module 306 may control the switch 108 based on the conditions of the components of the tool 302. For example, the tool control module 306 may disable the switch 108 and stop power supply from the cells 112 to the motor 106 if the temperature of the motor 106 and/or the temperature of the switch 108 crosses a predetermined threshold.

The battery pack 304 may include all of the components of the battery pack 204. Additionally the battery pack 304 may include a battery pack control module 310 and one or more sensors 312. The sensors 312 may sense one or more conditions of the components of the battery pack 304. For example, the sensors 312 may sense one or more conditions of the cells 112 and the capacitive element 206. For example, one of the sensors 312 may sense the temperature of the cells 112. Additionally, the sensors 312 may sense the voltage and/or current supplied by the cells 112. Further, the sensors 312 may sense the number of capacitors operating in the capacitive element 206 at a given time. For example, the number of capacitors operating in the capacitive element 206 at a given time may depend on the number of open circuit fuses at a given time. In addition, the presence of the capacitive element 206 can be sensed through an end of line test at the manufacturing facility.

The sensors 312 may output signals indicating the conditions of the cells 112 and the capacitive element 206 to the battery pack control module 310. The battery pack control module 310 may control the switch 114 based on the conditions of the components of the battery pack 304. For example, the battery pack control module 310 may disable the switch 114 and stop power supply from the cells 112 to the motor 106 if the temperature of the cells 112 crosses a predetermined threshold, the number of open circuit fuses exceeds a predetermined number, or the voltage and/or current of the cells 112 drops below a predetermined threshold.

Figure 5B:
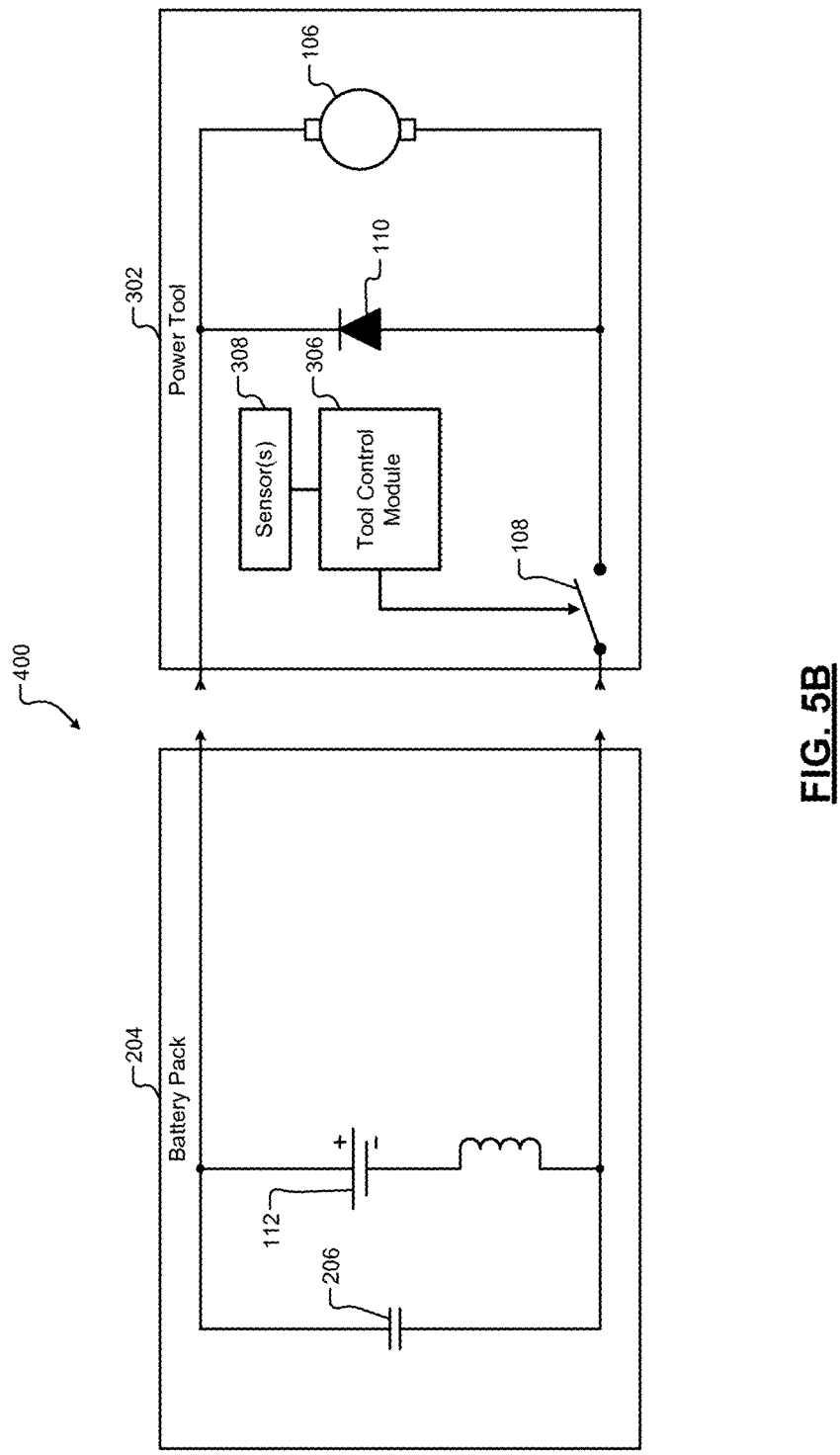
FIG. 5B is a functional block diagram of a power tool, where the tool includes a control module, and where the battery pack does not include a control module.

FIG. 5B is a functional block diagram of a power tool 400, where the tool includes a control module, and where the battery pack does not include a control module. The power tool 400 includes the tool 302 and the battery pack 204. The tool 302 operates as described with reference to FIG. 5A. The battery pack 204 operates as described with reference to FIG. 3 with the exception of performing functions related to the switch 114.

Figure 5C:
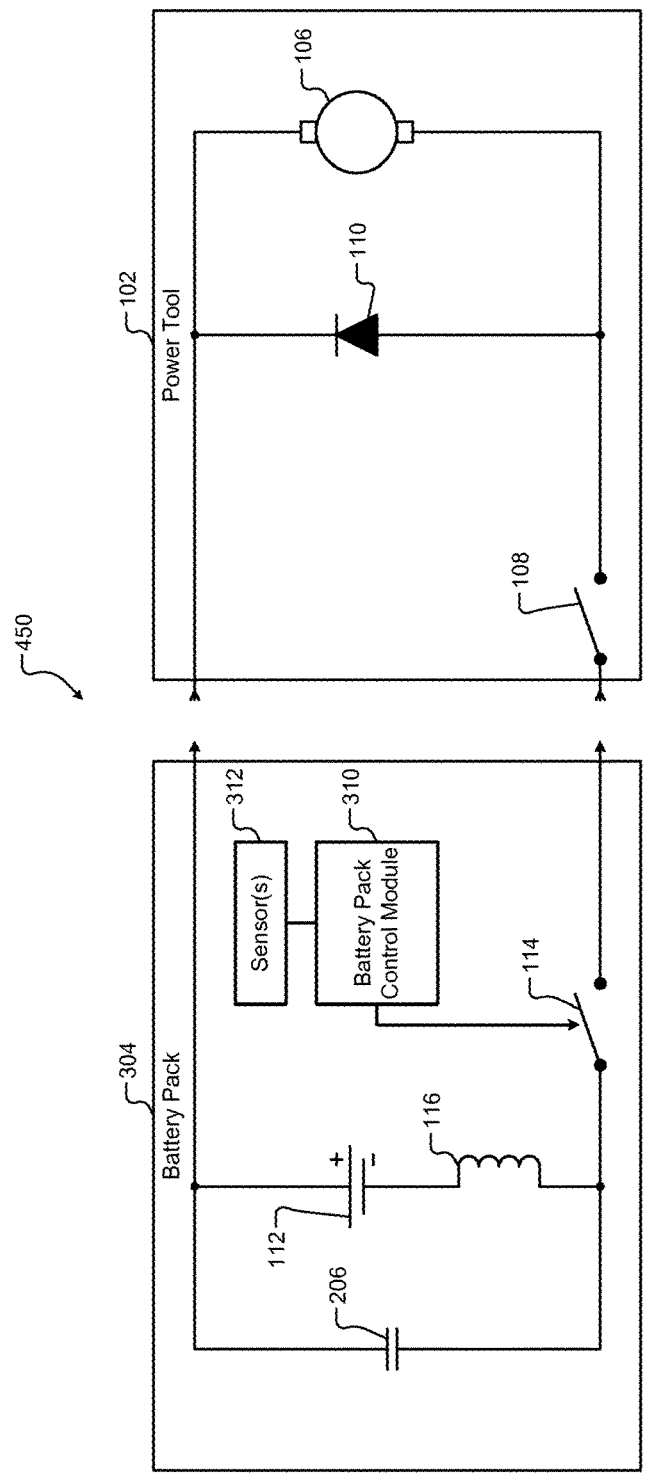
FIG. 5C is a functional block diagram of a power tool, where the battery pack includes a control module, and where the tool does not include a control module.

Additional configurations of the tool and the battery pack are contemplated. For example, in one configuration, a control module that controls the motor and the switch in the tool may be included in the battery pack instead of in the tool. FIG. 5C shows such a configuration. In FIG. 5C, a functional block diagram of a power tool 450 is shown, where the battery pack includes a control module, and where the tool does not include a control module. The power tool 450 includes the tool 102 and the battery pack 304. The tool 102 operates as described with reference to FIGS. 2 and 3. The battery pack 304 operates as described with reference to FIG. 4A and additionally performs the functions of the tool control module 306 shown in FIG. 5B. Further, the present disclosure uses the switches 108 and 114 only as examples of circuit components that may be protected using the capacitive element 206. The capacitive element 206 may be used to protect other circuit components from the inductive energy of the cells 112. In some embodiments, the capacitor array may be integrated into the power tool and not in a separate battery pack. That is, the battery may reside in the power tool.

Figure 6:
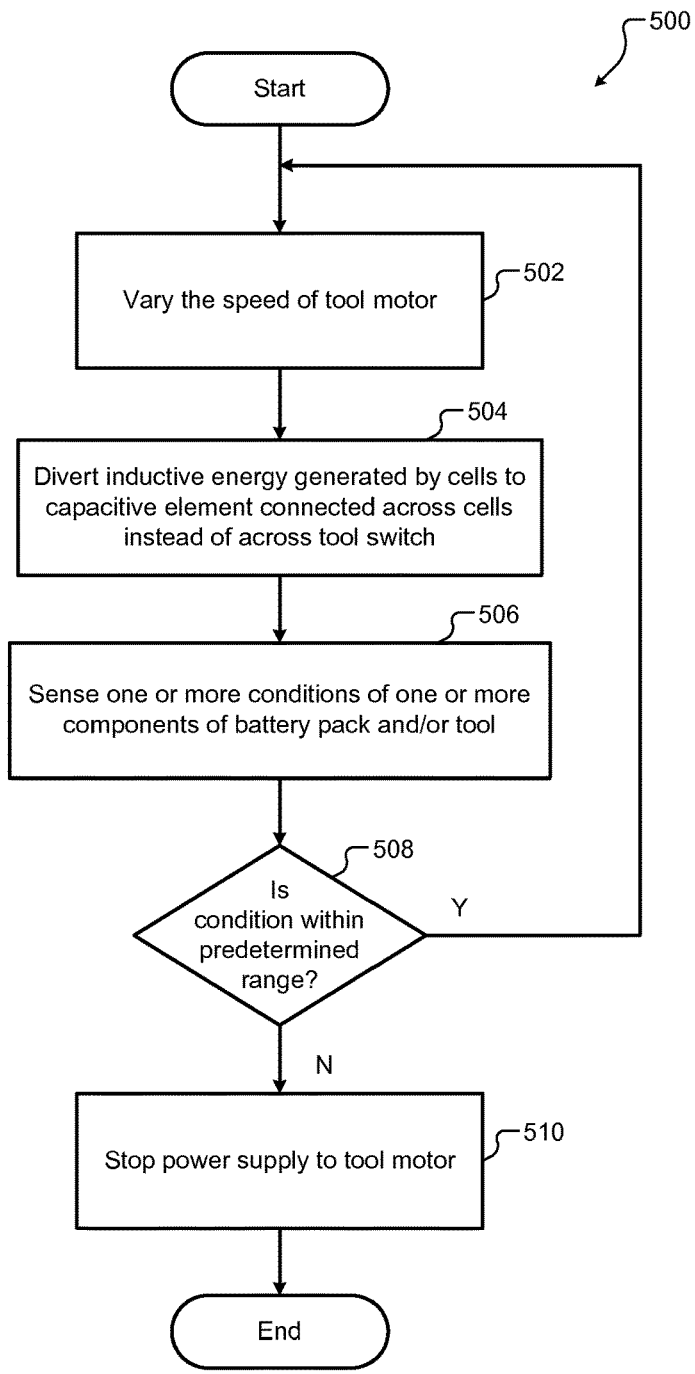
FIG. 6 is a flowchart of a method for diverting inductive energy from cells of a battery pack to a capacitive element connected across the battery pack.

FIG. 6 is a flowchart of a method 500 for operating a power tool by diverting inductive energy from cells of a battery pack to a capacitive element connected across the battery pack. At 502, a user varies the speed of the tool motor. At 504, when the speed of the tool motor is being varied (or when a simple on/off tool is turned off, or when the tool trigger is fully depressed in bypass mode and is released), the method 500 diverts inductive energy generated by the cells to the capacitive element connected across the cells, thereby preventing excessive inductive energy from being applied across the tool switch. In some implementations, at 506, the method 500 senses one or more conditions of one or more components of the battery pack and/or the tool. At 508, the method determines if a condition of a component of the battery pack and/or the tool is within a predetermined range. The method 500 returns to 502 if the conditions of the components of the battery pack and the tool are within the respective predetermined ranges. At 510, if a condition of a component of the battery pack and/or the tool is not within a predetermined range, the method 500 stops the power supply from the cells to the tool motor.

FIGS. 7A-7F show an example of an arrangement of electrochemical cells and the capacitive element in the battery pack. In FIG. 7A, a battery pack (e.g., battery pack 204 or 304) including a capacitive element (e.g., capacitive element 206) according to the present disclosure is shown. In FIG. 7B, the battery pack includes the cells 112 and the capacitive element 206. In FIGS. 7C-7E, the capacitive element 206 is shown in detail. In particular, the geometry of the capacitive element 206 is the same as that of any of the cells 112. In FIG. 7F, the capacitive element 206 is shown coupled to the cells 112.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A battery pack for supplying power to a power tool, the battery pack comprising:
   a housing having a first terminal and a second terminal and configured to detachable couple to the power tool;
   at least one electrochemical cell contained in the housing, the at least one electrochemical cell having a given shape and connected across the first terminal and the second terminal of the housing;
   a container contained in the housing, the container having a shape equivalent to the at least one electrochemical cell with dimensions equal to the given shape of the at least one electrochemical cell; and
   two or more capacitors electrically coupled together and contained in the container, where the two or more capacitors are connected across the first terminal and the second terminal of the housing.

2. The battery pack of claim 1 wherein the two or more capacitors store inductive energy generated by the at least one electrochemical cell.

3. The battery pack of claim 1 wherein a value of the two or more capacitors depend on a voltage supplied by the at least one electrochemical cells and a chemical composition of the at least one electrochemical cells.

4. The battery pack of claim 1 wherein:
   there are at least two electrochemical cells and the at least two electrochemical cells are connected in series, in parallel, or using a combination of series and parallel connections; and
   there are at least two capacitors and the at least two capacitors are connected in series, in parallel, or using a combination of series and parallel connections.

5. The battery pack of claim 1 further comprising a fuse coupled to the two or more capacitors, wherein the fuse transforms into an open circuit when one of the two or more capacitors associated with the fuse malfunctions.

6. The battery pack of claim 1 further comprising:
   a switch; and
   a controller that opens the switch to stop supply of power from the at least one electrochemical cells to a load when a temperature, voltage, or current of the at least one electrochemical cells crosses a predetermined threshold.

7. The battery pack of claim 1 wherein:
   an inductance of the at least one electrochemical cells is a sum of inductances of each of the at least one electrochemical cells; and
   a value of the inductance depends on a design of the at least one electrochemical cells.

8. The battery pack of claim 1 wherein the at least one electrochemical cell and the container have a cylindrical shape.

9. A battery pack, comprising:
   a housing for retaining one or more electrochemical cells;

an electrical connector extending upward from a top surface of the housing and adapted for coupling with an electrical connector of a power tool;

a support structure contained in the housing;

two or more electrochemical cells contained in the housing and affixed to the support structure, where each electrochemical cell has same solid geometry; and a container contained in the housing and affixed to the support structure, where the compartment has same solid geometry as the two or more electrochemical cells and houses a capacitor therein.

10. The battery pack of the claim 9 wherein the two or more electrochemical cells and the container have a cylindrical shape.

* * * * *